(12) United States Patent
Murahashi

(10) Patent No.: US 10,992,833 B2
(45) Date of Patent: Apr. 27, 2021

(54) IMAGE READING APPARATUS AND READING CONTROL METHOD

(71) Applicant: SEIKO EPSON CORPORATION, Tokyo (JP)

(72) Inventor: Kenichi Murahashi, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/800,068

(22) Filed: Feb. 25, 2020

(65) Prior Publication Data

US 2020/0274982 A1 Aug. 27, 2020

(30) Foreign Application Priority Data

Feb. 27, 2019 (JP) .............................. JP2019-033716

(51) Int. Cl.
*G06K 15/00* (2006.01)
*H04N 1/00* (2006.01)

(52) U.S. Cl.
CPC ..... *H04N 1/00809* (2013.01); *H04N 1/00689* (2013.01); *H04N 1/00721* (2013.01); *H04N 1/00824* (2013.01)

(58) Field of Classification Search
CPC ........... H04N 1/00809; H04N 1/00689; H04N 1/00721; H04N 1/00824
See application file for complete search history.

(56) References Cited

U.S. PATENT DOCUMENTS

| 2010/0158592 A1* | 6/2010 | Odagiri | H04N 1/00657 399/365 |
| 2012/0113487 A1* | 5/2012 | Murakami | H04N 1/00737 358/498 |
| 2015/0281488 A1* | 10/2015 | Kawauchi | H04N 1/0057 358/1.13 |
| 2017/0126911 A1* | 5/2017 | Kogi | H04N 1/00724 |
| 2019/0291987 A1* | 9/2019 | Yamazaki | B65H 5/06 |

FOREIGN PATENT DOCUMENTS

JP 2015-195442 A 11/2015

\* cited by examiner

*Primary Examiner* — Moustapha Diaby
(74) *Attorney, Agent, or Firm* — Global IP Counselors, LLP

(57) ABSTRACT

A control unit of an image reading apparatus determines, based on results of detection of an original document by a plurality of second detecting units, whether the original document will pass a position at which the original document is to be detected by a first detecting unit that is located downstream of the second detecting units and upstream of a reading unit. When it is determined that the original document will not pass a position at which the original document is to be detected by the first detecting unit, the control unit determines a timing for reading the original document by using the reading unit, relative to a time point at which the original document is detected by the second detecting units. The control unit causes the reading unit to read the original document at the determined reading timing.

8 Claims, 8 Drawing Sheets

FIG. 5

| | DETECTION RESULT | | | | | DETERMINATION |
|---|---|---|---|---|---|---|
| | SECOND DETECTING UNIT 14a | SECOND DETECTING UNIT 14b | SECOND DETECTING UNIT 14c | SECOND DETECTING UNIT 14d | SECOND DETECTING UNIT 14e | |
| 1 | ON | ON | ON | ON | ON | PASS |
| 2 | OFF | ON | ON | ON | ON | PASS |
| 3 | OFF | OFF | ON | ON | ON | NOT PASS |
| 4 | OFF | OFF | OFF | OFF | ON | NOT PASS |
| 5 | OFF | ON | ON | OFF | ON | NOT PASS |
| 6 | ON | ON | ON | OFF | OFF | PASS |
| 7 | ON | ON | OFF | OFF | OFF | PASS |
| 8 | ON | ON | OFF | OFF | OFF | NOT PASS |
| 9 | ON | OFF | OFF | OFF | OFF | NOT PASS |

FIG. 7

| | DETECTION RESULT | | | | | DETERMINATION |
|---|---|---|---|---|---|---|
| | SECOND DETECTING UNIT 14a | SECOND DETECTING UNIT 14b | SECOND DETECTING UNIT 14c | SECOND DETECTING UNIT 14d | SECOND DETECTING UNIT 14e | |
| 1 | ON | ON | ON | ON | ON | PASS AND NOT TILTED |
| 2 | OFF | ON | ON | ON | ON | PASS AND NOT TILTED |
| 3 | OFF | OFF | ON | ON | ON | NOT PASS |
| 4 | OFF | OFF | OFF | ON | ON | NOT PASS |
| 5 | OFF | OFF | OFF | OFF | ON | NOT PASS |
| 6 | ON | ON | ON | ON | OFF | PASS AND NOT TILTED |
| 7 | ON | ON | ON | OFF | OFF | PASS AND NOT TILTED |
| 8 | ON | ON | OFF | OFF | OFF | NOT PASS |
| 9 | ON | OFF | OFF | OFF | OFF | NOT PASS |

IMAGE READING APPARATUS AND READING CONTROL METHOD

The present application is based on, and claims priority from JP Application Serial Number 2019-033716, filed Feb. 27, 2019, the disclosure of which is hereby incorporated by reference herein in its entirety.

BACKGROUND

1. Technical Field

The present disclosure relates to an image reading apparatus and a reading control method.

2. Related Art

An image reading apparatus including a conveyor configured to perform a conveying operation of conveying an original document as a conveyed object, a plurality of original-document detecting sensors spaced apart from each other in a direction intersecting a direction of conveyance of the conveyed object by the conveyor, each original-document detecting sensor being configured to output detection information representing whether there is an object being conveyed, and a reading unit disposed downstream of the original-document detecting sensors and configured to read an image of the original document is disclosed (refer to JP-A-2015-195442). A sheet-feed scanner, such as the image reading apparatus disclosed in JP-A-2015-195442, initiates reading of an original document by a reading unit in response to detection of the original document by an original-document detecting sensor disposed upstream of the reading unit.

However, depending on the position and size of an original document set in a scanner by a user, there are some cases where, during the process of transporting the original document to the reading unit, the original document does not pass a position at which the original document is to be detected by the original-document detector, such that the original document is not detected by the original-document detecting sensor. When an original document is not detected by the original-document detecting sensor, reading of the original document by a reading unit is not performed, which is disadvantageous to the user.

SUMMARY

According to an aspect of the present disclosure, an image reading apparatus includes a transport unit that transports an original document in a first direction, a reading unit that reads the transported original document, a first detecting unit that detects the transported original document and that is provided upstream of the reading unit in the first direction, a plurality of second detecting units that detect the transported original document and that are provided upstream of the first detecting unit in the first direction at a plurality of positions spaced apart in a second direction intersecting the first direction, and a control unit that controls reading of the original document by the reading unit.

The control unit determines, based on results of detection of the original document by the plurality of second detecting units, whether the original document will pass a position at which the original document is to be detected by the first detecting unit. When it is determined that the original document will pass a position at which the original document is to be detected by the first detecting unit, the control unit determines a timing for reading the original document by using the reading unit, relative to a time point at which the original document is detected by the first detecting unit. When it is determined that the original document will not pass a position at which the original document is to be detected by the first detecting unit, the control unit determines a timing for reading the original document by using the reading unit, relative to a time point at which the original document is detected by the second detecting units. The control unit causes the reading unit to read the original document at the determined reading timing.

According to another aspect of the present disclosure, an image reading apparatus includes a transport unit that transports an original document in a first direction, a reading unit that reads the transported original document, a first detecting unit that detects the transported original document and that is provided upstream of the reading unit in the first direction, and a plurality of second detecting units that detect the transported original document and that are provided upstream in the first direction of the first detecting unit at a plurality of positions spaced apart in a second direction intersecting the first direction, and a control unit that controls reading of the original document by the reading unit.

The control unit determines, based on results of detection of the original document by the plurality of second detecting units, whether the original document will pass a position at which the original document is to be detected by the first detecting unit and whether the original document is tilted. When it is determined that the original document is tilted, the control unit ceases transport of the original document by the transport unit. When it is determined that the original document is not tilted and that the original document will pass the position at which the original document is to be detected by the first detecting unit, the control unit determines a timing for reading the original document by using the reading unit, relative to a time point at which the original document is detected by the first detecting unit. When it is determined that the original document is not tilted and that the original document will not pass the position at which the original document is to be detected by the first detecting unit, the control unit determines a timing for reading the original document by using the reading unit, relative to a time point at which the original document is detected by the second detecting units. The control unit causes the reading unit to read the original document at the determined reading timing.

BRIEF DESCRIPTION OF THE DRAWINGS

FIG. 5 is a diagram illustrating an example of a passage determination table according to the first embodiment.

FIG. 7 is a diagram illustrating an example of a passage determination table according to the second embodiment.

DESCRIPTION OF EXEMPLARY EMBODIMENTS

Hereinafter, embodiments of the present disclosure will be described with reference to the accompanying drawings. The drawings are for exemplary purposes only in order to illustrate the present embodiments. The drawings are exemplary and therefore are not integrated or omit some details in some cases.

1. Apparatus Configuration

Figure 1:
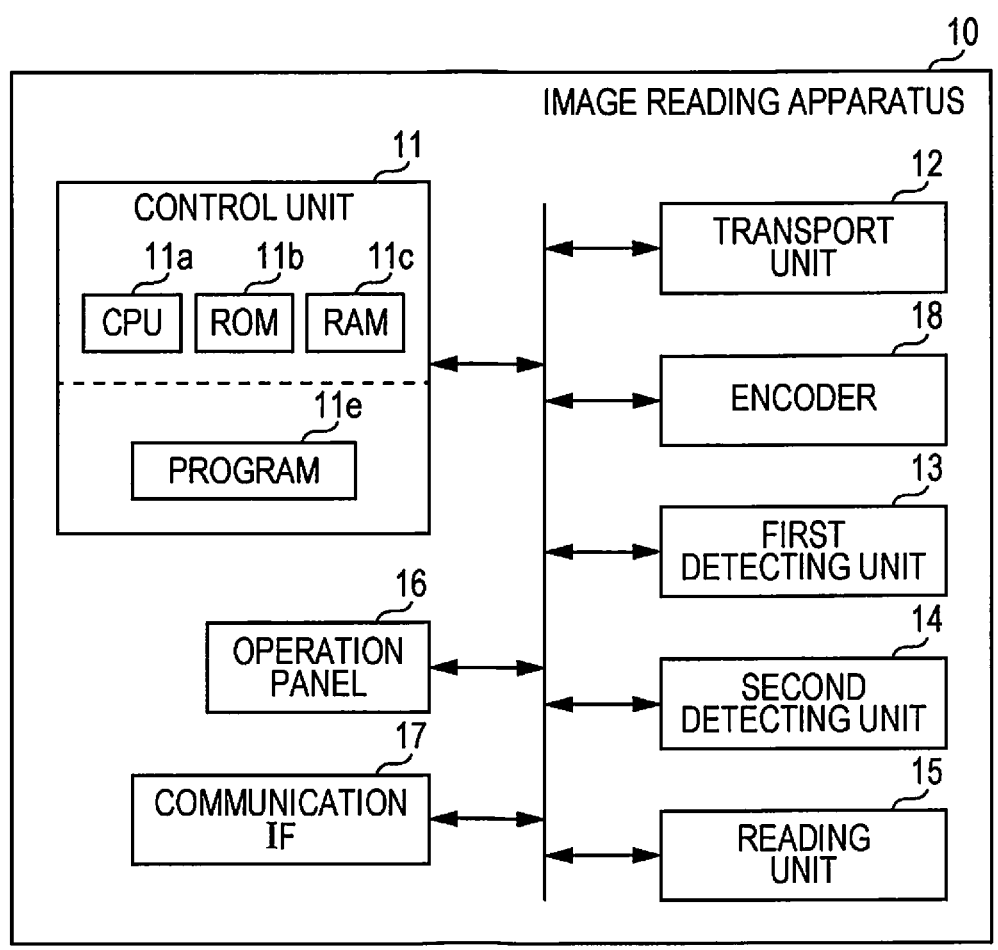
FIG. 1 is a block diagram illustrating a configuration of an image reading apparatus.

FIG. 1 simply illustrates a configuration of an image reading apparatus 10 according to the present embodiment. The image reading apparatus 10 is a scanner capable of reading an original document. The image reading apparatus 10 includes a control unit 11, a transport unit 12, a first detecting unit 13, a second detecting unit 14, a reading unit 15, an operation panel 16, a communication interface 17, and an encoder 18. The interface is abbreviated as IF. The control unit 11 includes, for example, a central processing unit (CPU) 11a as a processor, memories, such as a read-only memory (ROM) 11b and a random access memory (RAM) 11c, and other storage means, and so on, and controls the image reading apparatus 10 according to a program 11e stored in a memory. The control unit 11 performs a reading control process by following the program 11e. A reading control method is disclosed through the reading control process according to the present embodiment. The processor constituting the control unit 11 is not restricted to one CPU, and the control unit 11 may have a configuration in which processing is performed by a plurality of CPUs or a hardware circuit, such as an application specific integrated circuit (ASIC), or may have a configuration in which a CPU and a hardware circuit perform processing in conjunction with each other.

The transport unit 12 transports an original document from upstream to downstream in a first direction. The first direction may be referred to as an original-document transport direction. The expressions "upstream in the first direction" and "downstream in the first direction" are also referred to simply as "upstream" and "downstream", respectively. The original document, a typical example of which is paper, may be a sheet-like medium made of a material other than paper. The transport unit 12 includes a plurality of rollers for transporting an original document, a motor that provides motive power to a roller to rotate the roller, and so on.

The reading unit 15, which is a mechanism for optically reading an original document, includes a light source that illuminates an original document, an image sensor that outputs an electrical charge in accordance with transmitted light or reflected light from the original document, an optical system for guiding light to the image sensor, and the like. An original document transported by the transport unit 12 is read by the reading unit 15. Accordingly, the image reading apparatus 10 corresponds to a sheet-feed scanner. At least part of the transport unit 12 may also be referred to as an auto document feeder (ADF).

The operation panel 16 includes a display unit for displaying visual information, an operation reception unit for receiving operations from a user, and the like. The operation reception unit is a touch panel implemented on the display unit, a physical button, or the like. The communication IF 17 is a general term of one or more IFs in order for the image reading apparatus 10 to perform wired or wireless communication with the outside in conformity with a predetermined communication protocol including a known telecommunications standard.

The image reading apparatus 10 may be a multi-function product equipped with, in addition to the scanner functionality, multiple capabilities including printing, facsimile communication, e-mail transmission, and the like.

Figure 2:
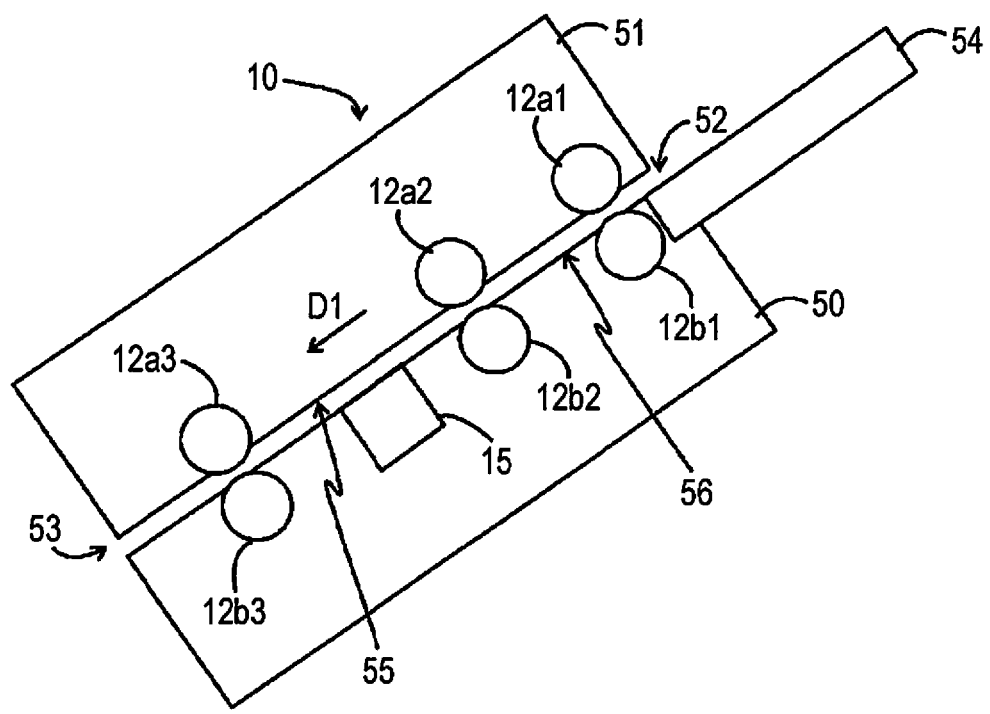
FIG. 2 is a diagram simply illustrating a mechanical structure of an image reading apparatus including a transport path.

FIG. 2 simply illustrates a mechanical structure of the image reading apparatus 10 including a transport path 55. As illustrated in FIG. 2, the image reading apparatus 10 includes a body portion 50 and a cover 51 that covers the top surface 56 of the body portion 50. The cover 51 is openable and closable with respect to the body portion 50. The transport path 55, along which an original document is transported by the transport unit 12, is secured between the body portion 50 and the cover 51. The transport unit 12 takes an original document from a supply port 52 on the upstream side of the transport path 55 into the housing of the image reading apparatus 10. Additionally, the transport unit 12 discharges an original document from a discharge port 53 on the downstream side of the transport path 55 to the outside. An arrow denoted by reference character D1 indicates the first direction.

An original-document mounting portion 54 for mounting an original document to be read is formed in the vicinity of the supply port 52. The original-document mounting portion 54 extends further upstream of the supply port 52 to have a size that allows the whole or substantially the whole of the surface of an original document having a predetermined size to be supported. That is, the original-document mounting portion 54 is responsible for the function of causing the top surface 56 of the body portion 50 to extend upstream. The original-document mounting portion 54 may be referred to as an original-document support portion, an original-document tray, or the like. The original-document mounting portion 54 may be a member separate from the body portion 50 or may be a region formed integrally with the body portion 50.

The reading unit 15 is held inside the body portion 50. In the example of FIG. 2, the reading unit 15 reads a surface facing the top surface 56 of the body portion 50 of an original document transported along the transport path 55 by the transport unit 12. However, the image reading apparatus 10 may have a configuration in which a reading unit is additionally included at a position that allows a surface facing the cover 51 of the original document transported along the transport path 55 by the transport unit 12 to be read. That is, the image reading apparatus 10 may be a scanner capable of simultaneously reading the front and back sides of an original document.

In FIG. 2, some pairs of rollers that face each other on both sides of the transport path 55 are illustrated as rollers constituting part of the transport unit 12. A roller pair consisting of a roller 12a1 and a roller 12b1 is referred to as a first roller pair. A roller pair consisting of a roller 12a2 and a roller 12b2 is referred to as a second roller pair. A roller pair consisting of a roller 12a3 and a roller 12b3 is referred to as a third roller pair. The rollers 12a1, 12a2, and 12a3 are arranged on the cover 51, and the rollers 12b1, 12b2, and 12b3 are arranged on the body portion 50. Each roller pair transports an original document by pinching the original document between rollers constituting the pair and rotating.

The first roller pair (the rollers 12a1, 12b1), which is located most upstream among the roller pairs illustrated in FIG. 2, is arranged somewhat downstream of the supply port 52. The first roller pair transports an original document mounted on the original-document mounting portion 54 to the downstream side.

The second roller pair (the rollers 12a2, 12b2), which is located downstream of the first roller pair and upstream of the reading unit 15, transports the original document transported by the first roller pair to the side further downstream. When passing the position of the reading unit 15 in the transport path 55, the original document transported by the second roller pair is read by the reading unit 15.

The third roller pair (the rollers 12a3, 12b3), which is located most downstream among the roller pairs illustrated in FIG. 2, is arranged downstream of the reading unit 15. The third roller pair transports the original document transported by the second roller pair to the side further downstream and discharges the original document from the discharge port 53 to the outside.

Figure 3:
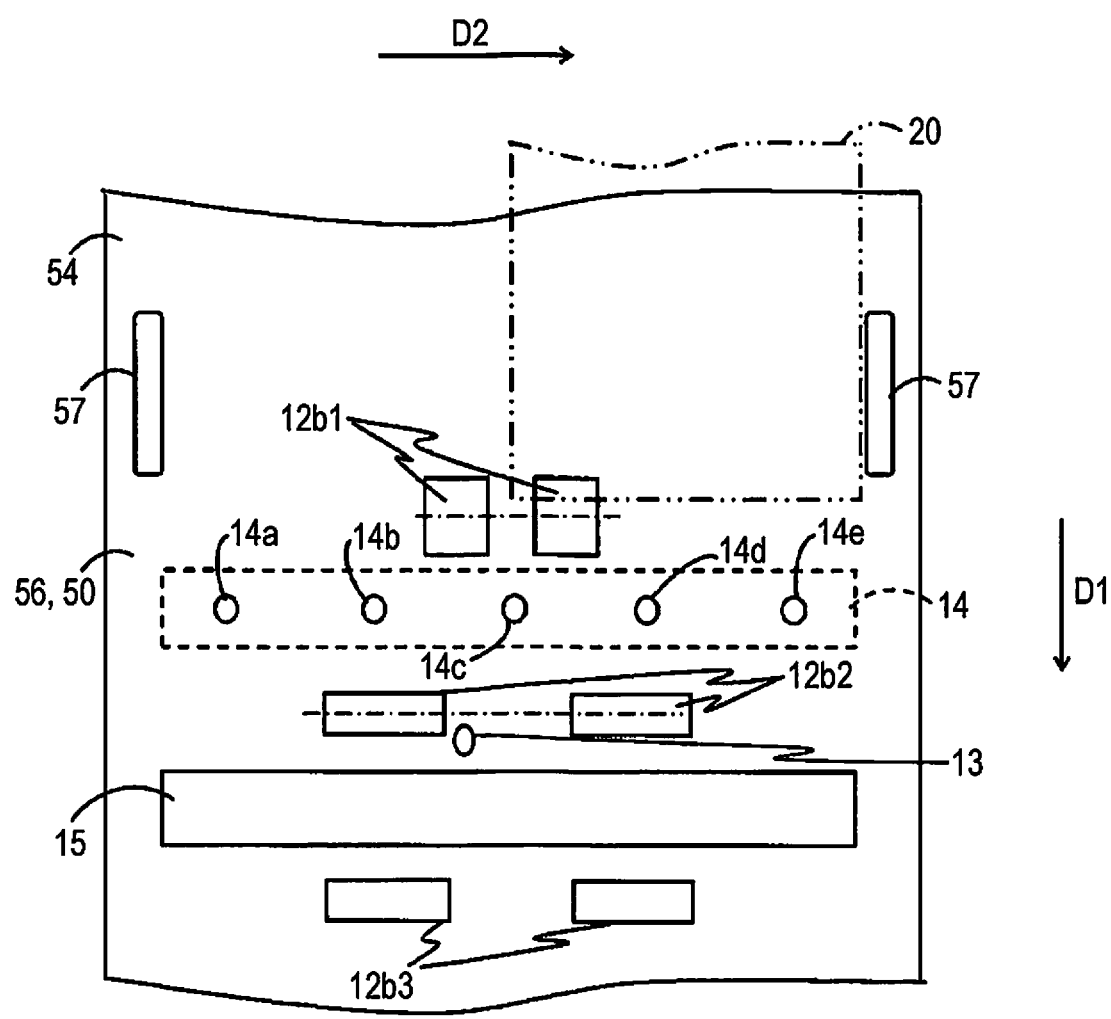
FIG. 3 is a diagram illustrating a range including an original-document mounting portion and part of a body portion, by a viewpoint facing the top surface.

FIG. 3 illustrates a range including respective parts of the body portion 50 and the original-document mounting portion 54 from the viewpoint facing the top surface 56. An arrow denoted by reference character D2 indicates a second direction. The second direction D2 may be referred to as a main scanning direction of the image sensor included in the reading unit 15 or may be referred to as an original-document width direction. The second direction D2 is transverse to the first direction D1. The term "transverse", as used herein, basically means being at right angles, which are not limited to being strictly at right angles. The terms "right" and "left" used herein refer to the right and left sides in FIG. 3.

Of course, in FIG. 3, among rollers constituting the first, second, and third roller pairs, only the rollers 12b1, 12b2, and 12b3 included in the body portion 50 are illustrated. In the example of FIG. 3, the rollers 12b1, 12b2, and 12b3 are provided such that two rollers 12b1, two rollers 12b2, and two rollers 12b3 are at symmetrical positions across the center of the top surface 56 in the second direction D2. From this, it may be understood that, in the example of FIG. 3, each of the first, second, and third roller pairs consists of two roller pairs.

In the description with reference to FIG. 3, it is assumed that the top surface 56 refers to a range corresponding to the transport path 55 in the top surface of the body portion 50, not the entire top surface of the body portion 50.

As illustrated in FIG. 3, the first detecting unit 13 and the second detecting unit 14 are provided to be exposed on the top surface 56 of the body portion 50. The first detecting unit 13 is a sensor for detecting an original document, outputting a predetermined OFF signal in the state where an original document is not detected, and outputting a predetermined ON signal in the state where an original document is detected. That is, the first detecting unit 13 outputs an ON signal until the trailing edge of an original document passes the position of the first detecting unit 13 after passage of the leading edge of the original document. The leading edge of an original document is an end of the original document facing downstream, and the trailing edge of an original document is an end of the original document facing upstream. The control unit 11 receives an output from the first detecting unit 13.

Turning now to the relative positional relationship among the first detecting unit 13, the second detecting unit 14, and reading unit 15, the first detecting unit 13 is located upstream of the reading unit 15, and the second detecting unit 14 is located upstream of the first detecting unit 13. In accordance with the example in FIG. 3, the first detecting unit 13 is provided between the pinch point of the second roller pair and the reading unit 15 in the first direction D1. The pinch point of a roller pair means a point at which each roller pinching an original document is in contact with the original document. Although contact between a roller and an original document is not a point contact but a surface contact in the strict sense, the expression "pinch point" is used in the present embodiments. In FIG. 3, the position of the pinch point of the rollers 12b2 constituting the second roller pair and the position of the pinch point of the rollers 12b1 constituting the first roller pair are represented by dash-dot lines.

In accordance with the example in FIG. 3, the second detecting unit 14 is provided between the pinch point of the first roller pair and the pinch point of the second roller pair in the first direction D1. Further, the second detecting units 14 are provided at a plurality of positions spaced apart in the second direction D2. That is, the image reading apparatus 10 includes a plurality of second detecting units 14a, 14b, 14c, 14d, and 14e. When each of the plurality of second detecting units 14 is illustrated, reference numerals 14a, 14b, 14c, 14d, and 14e are used. In contrast, when the plurality of second detecting units 14 are not distinguished from each other, reference numeral 14 is used. The number of the second detecting units 14 is not limited to five as illustrated in the example of FIG. 3.

The second detecting unit 14 is a sensor for detecting an original document, outputting a predetermined OFF signal in the state where an original document is not detected, and outputting a predetermined ON signal in the state where an original document is detected. That is, each of the second detecting units 14a, 14b, 14c, 14d, and 14e outputs an ON signal until the trailing edge of an original document passes the respective position after passage of the leading edge of the original document. The control unit 11 receives an output from the second detecting unit 14. The first detection unit 13 and the second detecting unit 14 may be sensors capable of detecting the presence of an original document and are implemented, for example, by contact-type sensors, optical sensors, or the like.

In the example of FIG. 3, all the positions of the second detecting units 14a, 14b, 14c, 14d, and 14e in the first direction D1 are the same. However, the positions of the second detecting units 14a, 14b, 14c, 14d, and 14e in the first direction D1 may be displaced from each other. In addition, the intervals between the second detecting units 14a, 14b, 14c, 14d, and 14e in the second direction D2 may be constant or may not be constant. In the example of FIG. 3, the second detecting unit 14c is located substantially at the center of the top surface 56 in the second direction D2, and the other second detecting units 14a, 14b, 14d, and 14e are symmetrically arranged on both sides of the central second detecting unit 14c.

In the example of FIG. 3, the second detecting units 14 are provided at a plurality of positions including two positions between which the position of the first detecting unit 13 is located in the second direction D2. Specifically, in the second direction D2, the first detecting unit 13 is provided at a position sandwiched between the second detecting unit 14b and the second detecting unit 14c.

The original-document mounting portion 54 includes edge guides 57, which are wall members that stand straight up. The edge guides 57 are two wall members that are present apart from each other in the second direction D2, and regulate the position in the second direction D2 of an original document mounted on the original-document mounting portion 54 from both sides of the original document. As known, the user is able to change the distance between the edge guides 57 by sliding the edge guides 57 in parallel with the second direction D2. FIG. 3 illustrates the state in which the distance between the edge guides 57 is greatest. Ideally, the user adjusts the positions of the edge guides 57 in accordance with the width of an original document so that the edge guides 57 regulate the position of the original document from both sides of the original document. Under the condition where the edge guides are suitably adjusted, the center of an original document in the second direction D2 substantially coincides with the center of the top surface 56 in the second direction D2, such that the original document that is neither too far to the right nor too far to the left is transported.

However, because adjustment of the edge guides 57 is troublesome for a user, in some cases, the image reading apparatus 10 is used under the condition where the distance between the edge guides 57 has a maximum value as illustrated in FIG. 3, regardless of the width of an original document. The condition where the distance between the edge guides 57 has a maximum value enables the user to freely place an original document whose width falls within the range lying between the right and left edge guides 57. Therefore, for example, the original document 20 having a relatively small size indicated by a dash-dot-dot line in FIG. 3 is mounted at a position closer to the edge guide 57 on either right or left side.

2. First Embodiment

Figure 4:
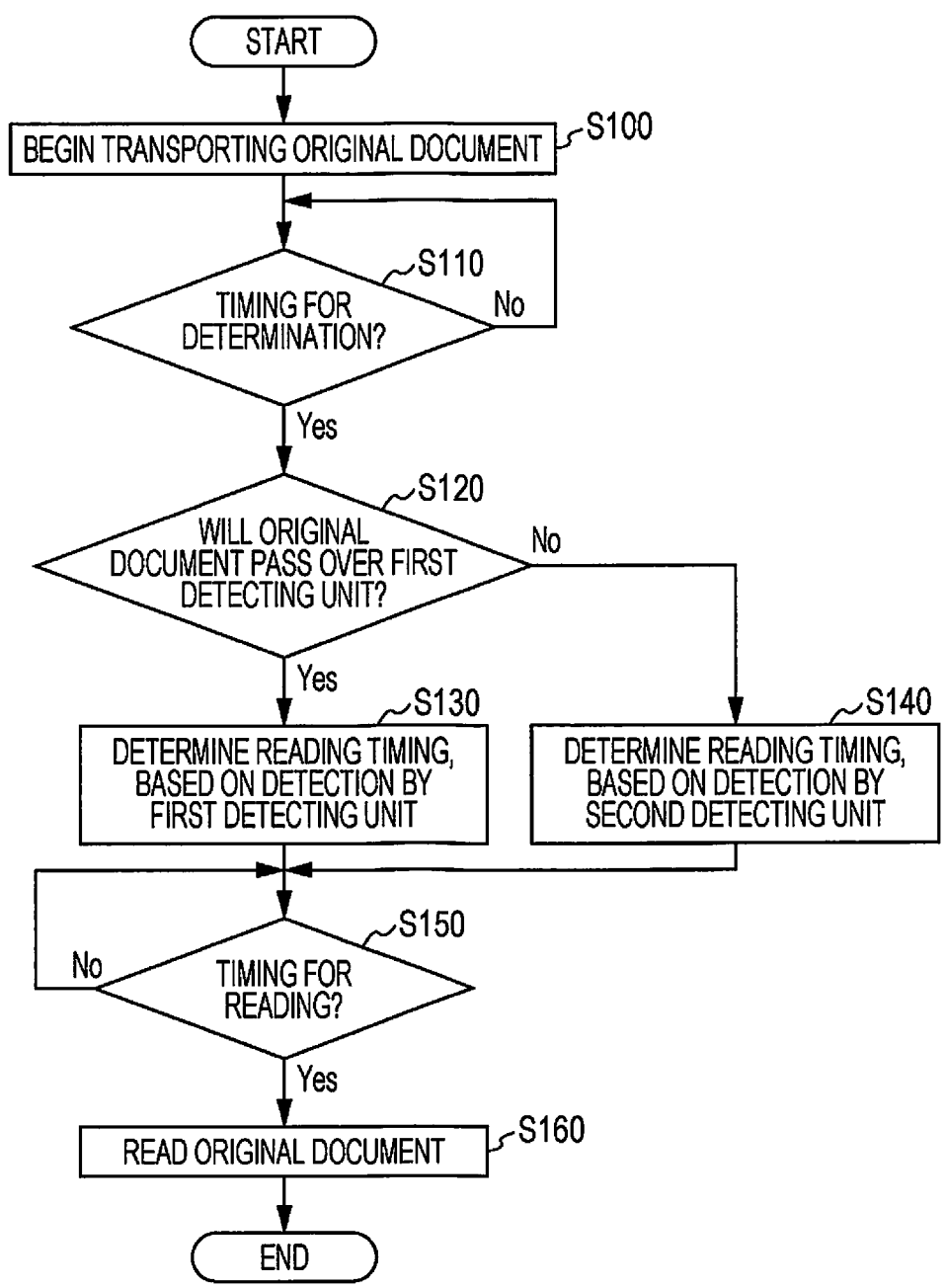
FIG. 4 is a flowchart illustrating a reading control process according to a first embodiment.

FIG. 4 illustrates, in a flowchart, a reading control process according to a first embodiment, which is executed according to the program lie by the control unit 11.

In response to receiving an instruction to begin scanning an original document, the control unit 11 controls the transport unit 12 to cause the transport unit 12 to begin transporting the original document (step S100). The transport unit 12 begins transporting the original document mounted on the original-document mounting portion 54. The control unit 11 receives an instruction to begin scanning, for example, through an operation of the user to the operation panel 16 or command transmission from an external computer (not illustrated) coupled via the communication IF 17.

After transport of the original document begins, the control unit 11 continuously determines whether a timing for making a determination in step S120 is reached (step S110). When the timing for making a determination in step S120 is reached (YES in step S110), the control unit 11 performs the determination in step S120. Specifically, when a second-detecting-unit passage time period determined in advance has elapsed after the transport of the original document began, the control unit 11 determines that the timing for making a determination in step S120 is reached.

Because of the design of the image reading apparatus 10, the distance from the first roller pair (the rollers 12*a*1, 12*b*1) to the second detecting unit 14 in the first direction D1 is determined. In addition, the velocity at which an original document is transported by the transport unit 12 is set in advance to any value. Therefore, a transport time period taken to cause the original document mounted on the original-document mounting portion 54 to arrive at the farthest second detecting unit 14 may be determined in advance by a calculation. The second-detecting-unit passage time period is a time period in which a predetermined additional time period is added to the transport time period determined by such a calculation, and is a time period sufficient for the leading edge of the original document mounted on the original-document mounting portion 54 to pass the position of the second detecting unit 14.

The farthest second detecting unit 14 is the second detecting unit 14 located most downstream among the plurality of second detecting units 14 and is determined in advance. However, in a configuration in which all the positions of the plurality of second detecting units 14 in the first direction D1 are the same, as in the example of FIG. 3, all the second detecting units 14 correspond to the farthest second detecting units 14.

In step S120, based on results of detection of the original document by the plurality of second detecting units 14 at the time point at which YES is determined in step S110, the control unit 11 determines whether the original document will pass a position at which the original document is to be detected by the first detecting unit 13. The position at which the original document is to be detected by the first detecting unit 13 is above the first detecting unit 13. Upon determining that the original document will pass the position at which the original document is to be detected by the first detecting unit 13 (YES in step S120), the control unit 11 proceeds to step S130, whereas, upon determining that the original document will not pass the position at which the original document is to be detected by the first detecting unit 13 (NO in step S120), the control unit 11 proceeds to step S140. The control unit 11 makes a determination in step S120 by referencing a passage determination table 30. At the time point of step S120, the original document being transported has not arrived at the first detecting unit 13. Therefore, the determination in step S120 is a prediction of whether the original document will pass the position at which the original document is to be detected by the first detecting unit 13.

FIG. 5 illustrates an example of the passage determination table 30. The passage determination table 30 is saved in advance in a memory included in the control unit 11 or another storage means that is able to be accessed by the control unit 11. The passage determination table 30 is a table specifying correspondence relationships between results of detection of an original document by the plurality of second detecting units 14 and determinations to be made in step S120. The passage determination table 30 specifies, for each of detection results 1 to 9, either the determination "pass" or the determination "not pass". For example, the detection result 1 is the case where all of the outputs of the second detecting units 14*a*, 14*b*, 14*c*, 14*d*, and 14*e* are ON signals, that is, all of the second detecting units 14*a*, 14*b*, 14*c*, 14*d*, and 14*e* detect an original document, and the determination is "pass". Accordingly, when, at the time at which YES is determined in step S110, all of the outputs of the second detecting units 14*a*, 14*b*, 14*c*, 14*d*, and 14*e* are ON signals, the control unit 11 references the passage determination table 30 to thereby determine "pass" (YES in step S120). For example, the detection result 2 is the case where all of the outputs of the second detecting units 14*b*, 14*c*, 14*d*, and 14*e* are ON signals and the output of the second detecting unit 14*a* is an OFF signal, that is, the case where the second detecting unit 14*a* does not detect an original document, whereas the second detecting units 14*b*, 14*c*, 14*d*, and 14*e* detect the original document, and the determination is "pass".

According to the example of FIG. 3, the second detecting units 14 at two positions between which the position of the first detecting unit 13 is located in the second direction D2 are the second detecting unit 14*b* and the second detecting unit 14*c*. Thus, when an original document is detected by the second detecting unit 14*b* and the second detecting unit 14*c*, the original document is highly likely to pass the position at which the original document is to be detected by the first detecting unit 13. In contrast, when an original document is not detected by at least one of the second detecting unit 14*b* and the second detecting unit 14*c*, the original document is highly unlikely to pass the position detected by the first detecting unit 13. Therefore, the passage determination table 30 specifies "pass" as determinations for the detection results 1, 2, 6, and 7, which correspond to the case where an original document is detected by the second detecting unit 14*b* and the second detecting unit 14*c*. In addition, the passage determination table 30 specifies "not pass" as determinations for the detection results 3, 4, 5, 8, and 9, which correspond to the case where an original document is detected by at least one of the second detecting unit 14*b* and the second detecting unit 14*c*.

In the passage determination table 30, the detection result 5 corresponds to the case where an original document transported by the first transport pair (the rollers 12*a*1, 12*b*1) is detected only by the second detecting unit 14*e* at the most right end among the second detecting units 14*a*, 14*b*, 14*c*, 14*d*, and 14*e*. In addition, in the passage determination table 30, the detection result 9 corresponds to the case where an original document transported by the first roller pair (the rollers 12*a*1, 12*b*1) is detected by only the second detecting unit 14*a* at the most left end among the second detecting units 14*a*, 14*b*, 14*c*, 14*d*, and 14*e*. However, by referencing the configuration of FIG. 3, the roller 12*b*1 is arranged between the second detecting unit 14*b* and the second detecting unit 14*d* in the second direction D2, and therefore the possibility that the detection result 5 and the detection result 9 will actually arise may be said to be rather low as compared with the detection results 1 to 4 and 6 to 8. Therefore, in the first embodiment, the passage determination table 30 may be a table that specifies determinations respectively corresponding to detection results 1 to 4 and 6 to 8 except the detection results 5 and 9. Alternatively, when the detection result 5 or the detection result 9 has occurred, the control unit 11 may proceed neither to step S130 nor to S140 and, as exceptional handling, may cause the transport unit 12 to cease the transport of the original document to terminate the process of the flowchart of FIG. 4.

In step S130, the control unit 11 determines a timing for reading the original document by using the reading unit 15, relative to a time point at which the original document is detected by the first detecting unit 13. Because of the design of the image reading apparatus 10, the distance from the first detecting unit 13 to the reading unit 15 in the first direction D1 is fixed. The speed at which an original document is transported by the transport unit 12 is determined in advance as described above. Therefore, a first arrival time period, which is a transport time period taken for an original document to arrive at the reading unit 15 after the original document is detected by the first detecting unit 13, may be determined in advance by calculation. Thus, if the determination result in step S120 is Yes, the control unit 11 determines a timing for reading the original document by using the reading unit 15 is a time point at which, relative to a time point at which the output of the first detecting unit 13 is switched from an OFF signal to an ON signal, the first arrival time period has elapsed since this time point.

In contrast, in step S140, the control unit 11 determines a timing for reading the original document by using the reading unit 15, relative to a time point at which the original document is detected by the second detecting unit 14. The second detecting unit 14 that has detected the original document, as used here, is any of the second detecting units 14 that outputs an ON signal when the determination result in step S110 is Yes. For example, it is assumed that because the detection results of an original document by a plurality of second detecting units 14 at the time point at which YES is determined in step S110 correspond to the detection result 3 of the passage determination table 30, the control unit 11 determines NO in step S120. In this case, since the second detecting units 14*c*, 14*d*, and 14*e* detect the original document, the control unit 11 may specify, as the reference second detecting unit, any one of these second detecting units 14*c*, 14*d*, and 14*e*.

Whether or not the positions of the second detecting units 14*a*, 14*b*, 14*c*, 14*d*, and 14*e* in the first direction D1 are the same, the respective distances to the reading unit 15 in the first direction D1 of the second detecting units 14*a*, 14*b*, 14*c*, 14*d*, and 14*e* are known to the control unit 11. The control unit 11 may therefore determine, by calculation, a second arrival time period, which is a transport time period taken for an original document to arrive at the reading unit 15 after the original document is detected by the reference second detecting unit. Thus, if the determination result in step S120 is No, the control unit 11 determines a timing for reading the original document by using the reading unit 15 is a time point at which, relative to a time point at which the output of the reference second detecting unit is switched from an OFF signal to an ON signal, the second arrival time period has elapsed since this time point. Of course, the first arrival time period is shorter than the second arrival time period.

After step S130, the control unit 11 continuously determines whether the timing for reading an original document by using the reading unit 15, which has been determined in step S130, is reached (step S150). Alternatively, after step S140, the control unit 11 continuously determines whether the timing for reading an original document by using the reading unit 15, which has been determined in step S140, is reached (step S150). If the timing for reading an original document is reached (YES in step S150), in step S160, the control unit 11 causes the reading unit 15 to perform reading of the original document. That is, at the timing of YES in step S150, the control unit 11 causes the reading unit 15 to begin reading of the original document.

Upon completion of reading of the original document by the reading unit 15, the control unit 11 ends the process of the flowchart of FIG. 4. Although the detailed description is omitted, the control unit 11 causes the transport unit 12 to further transport the original document that has been read by the reading unit 15 and to discharge the original document from the discharge port 53 to the outside. The control unit 11 may save image data as a reading result of an original document by the reading unit 15 to a predetermined memory in the image reading apparatus 10 or may be transferred to the outside via the communication IF 17. In the case where the image reading apparatus 10 is a multi-function product that also has a printing function, the control unit 11 may also perform a printing process based on image data as a reading result of an original document.

3. Second Embodiment

A second embodiment will be described next. The second embodiment differs from the first embodiment in that the process schematically branches off depending on whether an original document is tilted. For the second embodiment, description of the content common to the description given hitherto is appropriately omitted.

Figure 6:
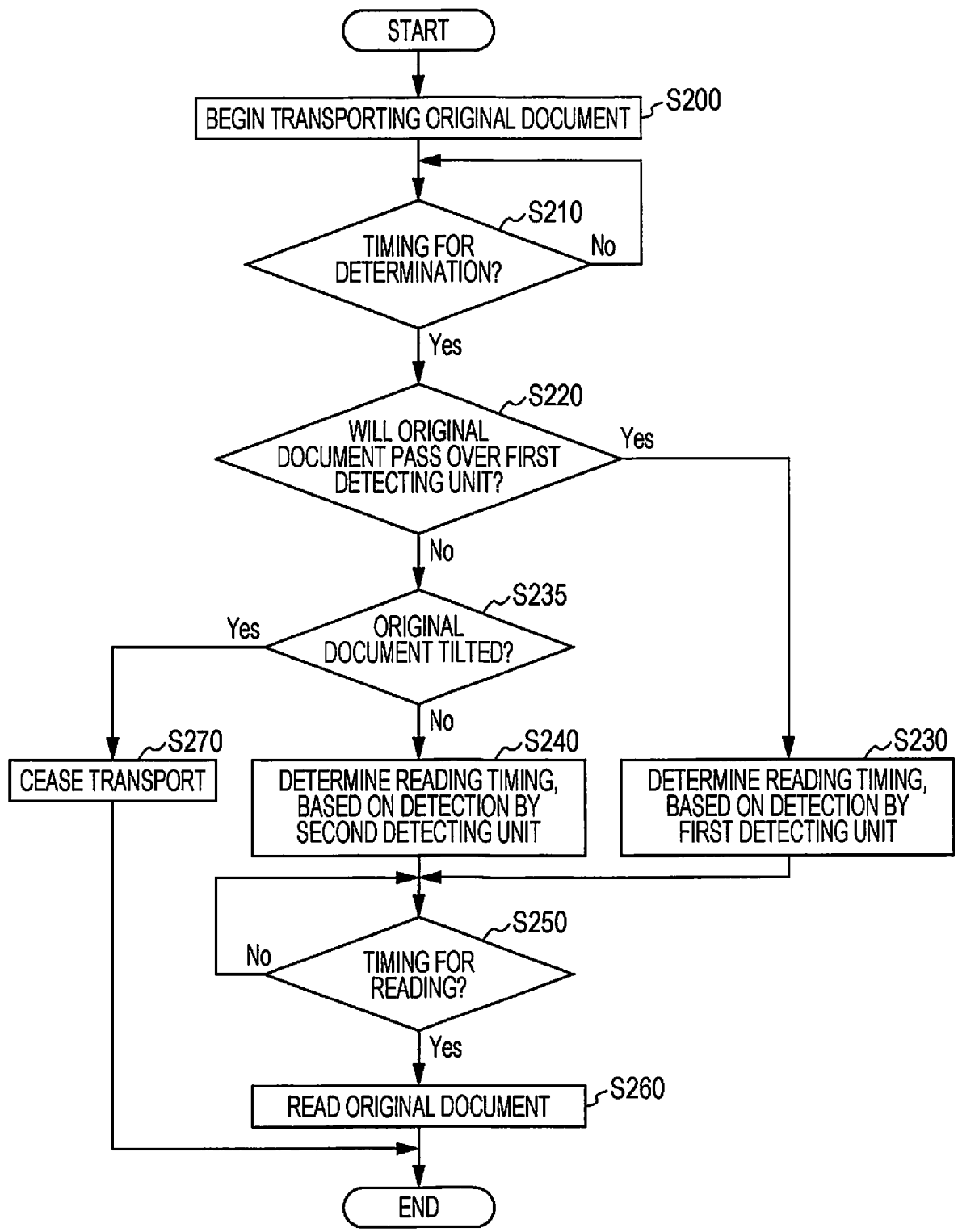
FIG. 6 is a flowchart illustrating a reading control process according to a second embodiment.

FIG. 6 illustrates, in a flowchart, a reading control process according to the second embodiment, which is executed according to the program 11*e* by the control unit 11. Steps S200 and S210 are the same as steps S100 and S110. Step S220, which is executed after YES is determining in step S210, may be understood as substantially the same as step S120. Upon determining that the original document will pass the position at which the original document is to be detected by the first detecting unit 13 (YES in step S220), the control unit 11 proceeds to step S230, whereas, upon determining that the original document will not pass the position at which the original document is to be detected by the first detecting unit 13 (NO in step S220), the control unit 11 proceeds to step S235. Step S230 is the same as step S130.

In step S220, the control unit 11 makes a determination by referencing a passage determining table 60 illustrated in FIG. 7. Like the passage determination table 30, the passage determination table 60 is saved in advance and specifies correspondence relationships between detection results 1 to 9 of an original document by the second detecting units 14a, 14b, 14c, 14d, and 14e and determinations to be made in step S220. In the second embodiment, when it may be determined that an original document will pass a position at which the original document is to be detected by the first detecting unit 13, that is, in the case of any of the detection results 1, 2, 6, and 7, the control unit 11 collectively considers that the original document is not tilted. Therefore, the passage determination table 60 specifies either a determination "pass and no tilted" or a determination "not pass" for each of the detection results 1 to 9.

Accordingly, the determination of YES in step S220 is a determination meaning that an original document is not tilted and the original document will pass a position at which the original document is to be detected by the first detecting unit 13. In the present embodiment, the expression "an original document is not tilted" is not limited to the state in which the direction of an original document transported by the transport unit 12 is strictly parallel to the first direction D1 but includes the state in which the original document is tilted in a permissible range, such that the original document is read by the reading unit 15 without any trouble.

In step S235, based on timings at which an original document is detected by the plurality of second detecting units 14, the control unit 11 determines whether the original document is tilted. As in the example of FIG. 3, in a configuration in which the respective positions in the first direction D1 of the second detecting units 14a, 14b, 14c, 14d, and 14e coincide with each other, in a situation where an original document is not tilted, the second detecting units 14 passed by the original document detect the original document simultaneously or substantially simultaneously. Thus, in step S235, if the difference in the count value of the encoder 18 when each of the second detecting units 14 detects an original document is less than a given acceptable value, the control unit 11 determines that the original document is not tilted. In contrast, if the difference in count value of the encoder 18 when each of the second detecting units 14 detects an original document exceeds the acceptable value, the control unit 11 determines that the original document is tilted.

As known, the encoder 18 outputs to the control unit 11 a count of pulse signals in accordance with the rotation of a motor included in the transport unit 12. Because one count given by the encoder 18 is equivalent to a predetermined minute distance, the control unit 11 ascertains the amount of transport of an original document by a variation in the count value after causing the transport unit 12 to begin transporting an original document. Accordingly, the difference in the count value of the encoder 18 when different second detecting units 14 individually detect an original document represents the level of a tilt of the original document. Upon determining in step S235 that an original document is tilted, the control unit 11 proceeds to step S270, whereas, upon determining in step S235 that the original document is not tilted, the control unit 11 proceeds to step S240. Step S240 is the same as step S140.

For example, it is assumed that because the detection results of an original document by a plurality of second detecting units 14 at the time point when YES is determined in step S210 correspond to the detection result 3 of the passage determination table 60, the control unit 11 determines NO in step S220. In this case, the second detecting units 14c, 14d, and 14e have each detected the original document. In step S235, the control unit 11 therefore compares, with the acceptance value, each of a difference between the count value at a time point when the output of the second detecting unit 14c is switched from an OFF signal to an ON signal and the count value at a time point when the output of the second detecting unit 14d is switched from an OFF signal to an ON signal, a difference between the count value at a time point when the output of the second detecting unit 14c is switched from an OFF signal to an ON signal and the count value at a time point when the output of the second detecting unit 14e is switched from an OFF signal to an ON signal, and a difference between the count value at a time point when the output of the second detecting unit 14d is switched from an OFF signal to an ON signal and the count value at a time point when the output of the second detecting unit 14e is switched from an OFF signal to an ON signal. If all of these differences are less than or equal to the acceptance value, it is determined that the original document is not tilted, whereas if one or more of these differences exceed the acceptance value, it is determined that the original document is tilted.

The positions in the first direction D1 of the second detecting units 14a, 14b, 14c, 14d, and 14e may be deviated from each other. In such a configuration, the control unit 11 may make a determination in step S235 in consideration of the distance in the first direction D1 between the second detecting units 14 that have detected the original document. For example, it is assumed that because the detection results of an original document by a plurality of second detecting units 14 at the time point when YES is determined in step S210 correspond to the detection result 4 of the passage determination table 60, the control unit 11 determines NO in step S220. In this case, the second detecting units 14d and 14e have each detected the original document. Because of the design of the image reading apparatus 10, the second detecting unit 14d is assumed to be located downstream of the second detecting unit 14e by a given distance. In such a case, in step S235, the control unit 11 may subtract a count value corresponding to the given distance from a difference between the count value at the time point when the output of the second detecting unit 14d is switched from an OFF signal to an ON signal and the count value at the time point when the output of the second detecting unit 14e is switched from an OFF signal to an ON signal, and may determine whether the absolute value of the remaining difference is less than or equal to the acceptable value.

As described in the first embodiment, the possibility that the detection result 5 and the detection result 9 will actually occur is low as compared with the detection results 1 to 4 and 6 to 8. The detection result 5 and the detection result 9 would occur in a situation where, at the timing of YES in step S210, part of the leading edge of an original document in a posture tilting to the first direction D1 is detected only by either the second detecting unit 14a or the second detecting unit 14e. Therefore, when because the detection results of an original document at the time point when YES is determined in step S210 correspond to the detection result 5 or the detection result 9 of the passage determining table 60, the control unit 11 has determined NO in step S220, in step S235, the control unit 11 forcibly determines that there is a tilt, and then proceeds to step S270.

In step S270, the control unit 11 ceases the transport of the original document by the transport unit 12 to terminate the process of the flowchart of FIG. 6. That is, if it is determined in step S235 that an original document is tilted, the transport of the original document is ceased, and the process of the flowchart terminates such that reading of the original document is not performed by the reading unit 15.

The determination in step S250 and step S260 performed after step S230 or step S240 are the same as the determination in step S150 and step S160 performed after step S130 or step S140.

4. Summarization

According to the present embodiments as described above, the image reading apparatus 10 includes the transport unit 12 that transports an original document in the first direction D1, the reading unit 15 that reads the transported original document, the first detecting unit 13 that detects the transported original document and that is provided upstream of the reading unit 15 in the first direction D1, a plurality of second detecting units 14 that detect the transported original document and that are provided upstream of the first detecting unit 13 in the first direction D1 at a plurality of positions spaced apart in the second direction D2 intersecting the first direction D1, and the control unit 11 that controls reading of the original document by the reading unit 15.

According to the first embodiment, based on results of detection of the original document by the plurality of second detecting units 14, the control unit 11 determines whether the original document will pass a position at which the original document is to be detected by the first detecting unit 13. When it is determined that the original document will pass a position at which the original document is to be detected by the first detecting unit 13, the control unit 11 determines a timing for reading the original document by using the reading unit 15, relative to a time point at which the original document is detected by the first detecting unit 13. When it is determined that the original document will not pass the position at which the original document is to be detected by the first detecting unit 13, the control unit 11 determines a timing for reading the original document by using the reading unit 15, relative to a time point at which the original document is detected by the second detecting units 14. The control unit 11 causes the reading unit 15 to read the original document at the determined reading timing.

According to this configuration, even when it is predicted that an original document will not pass the position of the first detecting unit 13 for detecting the transported original document immediately before the reading unit 15, the timing for reading the original document is determined relative to the time point at which the original document is detected by the plurality of second detecting units 14 arranged upstream of the first detecting unit 13, and the reading unit 15 is caused to read the original document. This may solve a problem in that when an original document is not detected by an original-document detecting sensor, reading of the original document is not performed, and may reduce disadvantages of the user.

In particular, as illustrated in FIG. 3, when the image reading apparatus 10 is used in a situation where the distance between the edge guides 57 has a maximum value, the user may freely place, on the original-document mounting portion 54, an original document having a size with a width that falls within a range sandwiched between the edge guides 57 on either side. Therefore, an original document having a relatively small size is occasionally transported from a position closer to the edge guide 57 on either right or left side to the downstream side of the first direction D1. In such a case, although it is fully contemplated that an original document would not pass over the first detecting unit 13, according to the present embodiments, an original document that does not pass over the first detecting unit 13 may be read by the reading unit 15.

For example, the second detecting units 14 are provided at a plurality of positions including two positions between which the position of the first detecting unit 13 is located in the second direction D2.

According to the first embodiment, the control unit 11 determines that an original document will pass the position at which the original document is to be detected by the first detecting unit 13, when the original document is detected by the two second detecting units 14 at the two positions between which the position of the first detecting unit 13 is located in the second direction D2, whereas the control unit 11 determines that the original document will not pass the position at which the original document is to be detected by the first detecting unit 13, when the original document is not detected by at least one of the two second detecting units 14 at the two positions.

According to this configuration, it may be determined accurately whether an original document will pass a position at which the original document is to be detected by the first detecting unit 13.

According to the second embodiment, the control unit 11 determines, based on results of detection of the original document by the plurality of second detecting units 14, whether the original document will pass a position at which the original document is to be detected by the first detecting unit 13 and whether the original document is tilted, and ceases transport of the original document by the transport unit 12 when it is determined that the original document is tilted. When it is determined that the original document is not tilted and that the original document will pass the position at which the original document is to be detected by the first detecting unit 13, the control unit 11 determines a timing at which the original document is to be read by the reading unit 15, relative to a time point at which the original document is detected by the first detecting unit 13, whereas when it is determined that the original document is not tilted and that the original document will not pass the position at which the original document is to be detected by the first detecting unit 13, the control unit 11 determines a timing at which the original document is to be read by the reading unit 15, relative to a time point at which the original document is detected by the second detecting unit 14. The control unit 11 causes the reading unit 15 to read the original document at the determined reading timing.

In the second embodiment, as in the first embodiment, even when it is predicted that an original document will not pass the position of the first detecting unit 13 for detecting the transported original document immediately before the reading unit 15, the timing at which the original document is to be read is determined, relative to the time point at which the original document is detected by the plurality of second detecting units 14 arranged upstream of the first detecting unit 13, and the reading unit 15 is caused to read the original document. As in the first embodiment, this may reduce disadvantages of the user. In addition, in the second embodiment, when an original document is tilted, the transport of the original document is ceased. This may inhibit the original document in a tilted state from being read by the reading unit 15 and may reduce the possibility that a so-called paper jam will occur.

Additionally, according to the second embodiment, when an original document is detected by the two second detecting units 14 at the two positions between which the position of the first detecting unit 13 is located in the second direction D2, the control unit 11 determines that the original document is not tilted and that the original document will pass a position at which the original document is to be detected by the first detecting unit 13, whereas when the original document is not detected by at least one of the two second detecting units 14 at the two positions, the control unit 11 determines that the original document will not pass the position at which the original document is to be detected by the first detecting unit 13.

According to this configuration, it may be determined efficiently in accordance with an actual situation whether an original document is not tilted and whether the original document will pass a position at which the original document is to be detected by the first detecting unit 13.

The transport unit 12 may include a first roller pair that transports the original document by pinching the original document, and a second roller pair that is provided at a position downstream of the first roller pair and upstream of the reading unit 15 in the first direction D1 and that transports the original document by pinching the original document. The plurality of second detecting units 14 may be provided between a pinch point of the first roller pair and a pinch point of the second roller pair in the first direction D1, and the first detecting unit 13 is provided between the pinch point of the second roller pair and the reading unit 15 in the first direction D1.

The present embodiments disclose reading control methods that control transport of an original document in the first direction D1 and reading of the transported original document.

That is, according to the first embodiment, the reading control method includes a determining step of determining whether the original document will pass a position at which the original document is to be detected by the first detecting unit 13 provided upstream in the first direction D1 of the reading unit 15 for performing the reading, based on results of detection of the original document by the plurality of second detecting units 14 provided upstream of the first detecting unit 13 in the first direction D1 at a plurality of positions spaced apart in the second direction D2 intersecting the first direction D1 (step S120), a timing-determining step of, when it is determined in the determining step that the original document will pass a position at which the original document is to be detected by the first detecting unit 13, determining a timing for reading the original document by using the reading unit 15, relative to a time point at which the original document is detected by the first detecting unit 13, and, when it is determined in the determining step that the original document will not pass a position at which the original document is to be detected by the first detecting unit 13, determining a timing for reading the original document by using the reading unit 15, relative to a time point at which the original document is detected by the second detecting units 14 (steps S130, S140), and a reading step of causing the reading unit 15 to read the original document at the determined reading timing (step S160).

Additionally, according to the second embodiment, the reading control method includes a determining step of determining whether an original document will pass a position at which the original document is to be detected by the first detecting unit 13 provided upstream in the first direction D1 of the reading unit 15 for performing the reading, based on results of detection of the original document by the plurality of second detecting units 14 provided upstream of the first detecting unit 13 in the first direction D1 at a plurality of positions spaced apart in the second direction D2 intersecting the first direction D1 (steps S220, S235), a ceasing step of, when it is determined that the original document is tilted, ceasing transport of the original document (step S270), a timing-determining step of, when it is determined in the determining step that the original document is not tilted and that the original document will pass a position at which the original document is to be detected by the first detecting unit 13, determining a timing for reading the original document by using the reading unit 15, relative to a time point at which the original document is detected by the first detecting unit 13, and, when it is determined that the original document is not tilted and that the original document will not pass a position at which the original document is to be detected by the first detecting unit 13, determining a timing for reading the original document by using the reading unit 15, relative to a time point at which the original document is detected by the second detecting units 14 (steps S230, S240); and a reading step of causing the reading unit 15 to read the original document at the determined reading timing (step S260).

5. Description of Modifications and the Like

When the determination of a reading timing is triggered by detecting an original document to be read with a sensor at a position as close as possible to the reading unit 15, effects of fine variations and errors in transport operations of the transport unit 12 may be reduced, so that a reading result with higher quality is obtained. From such a viewpoint, upon causing the reading unit 15 to read an original document at a reading timing that is determined relative to a time point at which the original document is detected by the second detecting units 14, the control unit 11 may give an outside a warning that transport of the original document is not normal.

In the first embodiment, specifically, the control unit 11 gives the warning after performing step S160 through steps S140 and S150. Additionally, in the second embodiment, the control unit 11 performs the warning, after performing step S260 through steps S240 and S250.

Figure 8:
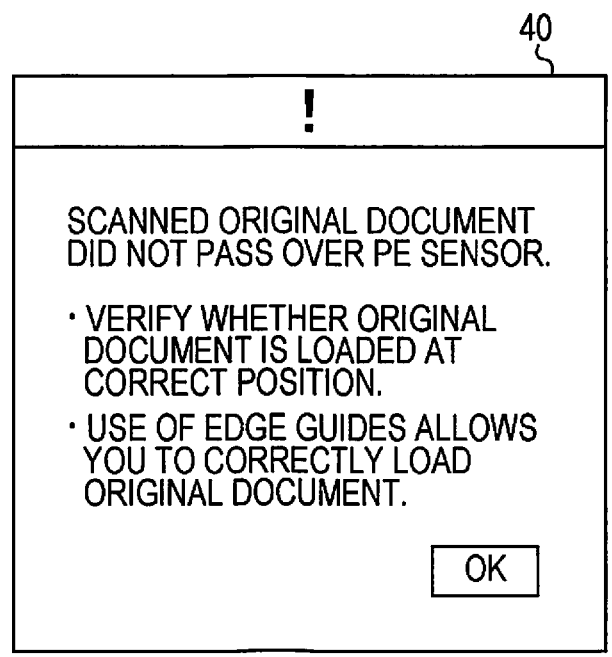
FIG. 8 is a diagram illustrating an example of a UI screen.

FIG. 8 illustrates a user interface (UI) screen 40 as an example of the warning mentioned above. The control unit 11 causes the display unit of the operation panel 16 to display the UI screen 40 as the warning. The UI screen 40 includes, for example, a message "The scanned original document did not pass over the PE sensor". The PE sensor is a paper edge sensor, meaning the first detecting unit 13. By viewing the UI screen 40, the user recognizes that the original document was transported through a position at which the original document was not detected by the first detecting unit 13 and was scanned, that is, the transport of the original document was not normal. Additionally, prompting the user to verify whether an original document is loaded at a correct position, providing advice on how to correctly load an original document, and the like are displayed as messages on the UI screen 40.

The contents of the passage determination tables 30 and 60 illustrated in FIG. 5 and FIG. 7 are made on the condition of the configuration illustrated in FIG. 3. Accordingly, when the number of the second detecting units 14 and the relative positional relationship between the plurality of second detecting units 14 and the first detecting unit 13 in the second direction D2 differ from those in FIG. 3, of course, the contents of the passage determination tables 30 and 60 also change from those illustrated in FIG. 5 and FIG. 7.

To determine whether an original document will pass a position at which the original document is to be detected by the first detecting unit 13, in step S120 and step S220, a determination way mentioned below may be employed.

The control unit 11 may determine whether an original document will pass a position detected by the first detecting unit 13, for example, depending on whether the original document has been detected by the second detecting unit 14 having the shortest distance to the first detecting unit 13 in the second direction D2. It is assumed that the second detecting unit 14*c* is the second detecting unit 14 having the shortest distance to the first detecting unit 13 in the second direction D2. In this case, when an original document is detected by the second detecting units 14 including the second detecting unit 14*c*, the control unit 11 may determine that the original document will pass a position at which the original document is to be detected by the first detecting unit 13, whereas when the original document is detected by any second detecting unit 14 other than the second detecting unit 14*c*, the control unit 11 may determine that the original document will not pass a position at which the original document is to be detected by the first detecting unit 13.

Any one of the plurality of second detecting units 14 may have a configuration in which the position in the second direction D2 coincides with that of the first detecting unit 13. For example, the second detecting unit 14*c* is assumed to be arranged at the same position as the first detecting unit 13 in the second direction D2. In this case, when an original document is detected by the second detecting unit 14 including the second detecting unit 14*c*, the control unit 11 determines that the original document will pass a position at which the original document is to be detected by the first detecting unit 13, whereas when the original document is detected by any of the second detecting units 14 other than the second detecting unit 14*c*, the control unit 11 may determine that the original document will not pass the position at which the original document is to be detected by the first detecting unit 13.

In step S220 according to the second embodiment, when it may be determined that an original document will pass a position at which the original document is to be detected by the first detecting unit 13, the control unit 11 also regards that the original document is not tilted, and proceeds to step S230. This is based on the idea that if an original document passes a position at which the original document is to be detected by the first detecting unit 13, that is, if an original document is transported at the substantially the center of the transport path 55 in the first direction D1, the original document may be appropriately read.

However, when, in step S220, it is determined that an original document will pass a position at which the original document is to be detected by the first detecting unit 13 (YES in step S220), the control unit 11 does not regard that the original document is not tilted, but may actually make a determination in step S235 as in the case where NO is determined in step S220. In accordance with the results of both of a determination in step S220 as to whether an original document will pass a position detected by the first detecting unit 13 and a determination in step S235 as to whether the original document is tilted, the control unit 11 may proceed to any of steps S230, S240, and S270.

Although unusual, there may be a situation where at the time points at which YES is determined in step S110 and step S210, none of the plurality of second detecting units 14 has detected the original document. If such a situation has occurred, the control unit 11 recognizes an error of transport, causes the transport unit 12 to cease transport of the original document, and terminates the processes of the flowcharts in FIG. 4 and FIG. 6.

What is claimed is:

1. An image reading apparatus comprising:
 a transport unit that transports an original document in a first direction;
 a reading unit that reads the transported original document;
 a first detecting unit that detects the transported original document and that is provided upstream of the reading unit in the first direction;
 a plurality of second detecting units that detect the transported original document and that are provided upstream of the first detecting unit in the first direction at a plurality of positions spaced apart in a second direction intersecting the first direction; and
 a control unit that controls reading of the original document by the reading unit,
 wherein the control unit
  determines, based on results of detection of the original document by the plurality of second detecting units, whether the original document will pass a position at which the original document is to be detected by the first detecting unit,
  when it is determined that the original document will pass a position at which the original document is to be detected by the first detecting unit, determines a timing for reading the original document by using the reading unit, relative to a time point at which the original document is detected by the first detecting unit,
  when it is determined that the original document will not pass a position at which the original document is to be detected by the first detecting unit, determines a timing for reading the original document by using the reading unit, relative to a time point at which the original document is detected by the second detecting units, and
  causes the reading unit to read the original document at the determined reading timing.

2. The image reading apparatus according to claim 1, wherein
 the second detecting units are provided at a plurality of positions including two positions between which a position of the first detecting unit is located in the second direction, and
 the control unit
  determines that the original document will pass the position at which the original document is to be detected by the first detecting unit, when the original document is detected by two of the second detecting units at the two positions, and
  determines that the original document will not pass the position at which the original document is to be detected by the first detecting unit, when the original document is not detected by at least one of the two second detecting units at the two positions.

3. The image reading apparatus according to claim 1, wherein
the transport unit includes a first roller pair that transports the original document by pinching the original document, and a second roller pair that is provided at a position downstream of the first roller pair and upstream of the reading unit in the first direction and that transports the original document by pinching the original document,
the plurality of second detecting units are provided between a pinch point of the first roller pair and a pinch point of the second roller pair in the first direction, and
the first detecting unit is provided between the pinch point of the second roller pair and the reading unit in the first direction.

4. The image reading apparatus according to claim 1, wherein, upon causing the reading unit to read the original document at the reading timing determined relative to the time point at which the original document is detected by the second detecting units, the control unit gives an outside a warning that transport of the original document is not normal.

5. An image reading apparatus comprising:
a transport unit that transports an original document in a first direction;
a reading unit that reads the transported original document;
a first detecting unit that detects the transported original document and that is provided upstream of the reading unit in the first direction, and
a plurality of second detecting units that detect the transported original document and that are provided upstream in the first direction of the first detecting unit at a plurality of positions spaced apart in a second direction intersecting the first direction; and
a control unit that controls reading of the original document by the reading unit,
wherein the control unit
determines, based on results of detection of the original document by the plurality of second detecting units, whether the original document will pass a position at which the original document is to be detected by the first detecting unit and whether the original document is tilted,
when it is determined that the original document is tilted, ceases transport of the original document by the transport unit,
when it is determined that the original document is not tilted and that the original document will pass the position at which the original document is to be detected by the first detecting unit, determines a timing for reading the original document by using the reading unit, relative to a time point at which the original document is detected by the first detecting unit,
when it is determined that the original document is not tilted and that the original document will not pass the position at which the original document is to be detected by the first detecting unit, determines a timing for reading the original document by using the reading unit, relative to a time point at which the original document is detected by the second detecting units, and
causes the reading unit to read the original document at the determined reading timing.

6. The image reading apparatus according to claim 5, wherein
the second detecting units are provided at a plurality of positions including two positions between which a position of the first detecting unit is located in the second direction, and
the control unit
determines that the original document is not tilted and that the original document will pass a position at which the original document is to be detected by the first detecting unit, when the original document is detected by the two second detecting units at the two positions, and
determines that the original document will not pass the position at which the original document is to be detected by the first detecting unit, when the original document is not detected by at least one of the two second detecting units at the two positions.

7. A reading control method that controls transport of an original document in a first direction and reading of the transported original document, comprising:
a determining step of determining whether the original document will pass a position at which the original document is to be detected by a first detecting unit provided upstream in the first direction of a reading unit for performing the reading, based on results of detection of the original document by a plurality of second detecting units provided upstream of the first detecting unit in the first direction at a plurality of positions spaced apart in a second direction intersecting the first direction;
a timing-determining step of, when it is determined in the determining step that the original document will pass a position at which the original document is to be detected by the first detecting unit, determining a timing for reading the original document by using the reading unit, relative to a time point at which the original document is detected by the first detecting unit, and, when it is determined that the original document will not pass a position at which the original document is to be detected by the first detecting unit, determining a timing for reading the original document by using the reading unit, relative to a time point at which the original document is detected by the second detecting units, and
a reading step of causing the reading unit to read the original document at the determined reading timing.

8. A reading control method that controls transport of an original document in a first direction and reading of the transported original document, comprising:
a determining step of determining whether the original document will pass a position at which the original document is to be detected by a first detecting unit provided upstream in the first direction of a reading unit for performing the reading, based on results of detection of the original document by a plurality of second detecting units provided upstream of the first detecting unit in the first direction at a plurality of positions spaced apart in a second direction intersecting the first direction;
a ceasing step of, when it is determined in the determining step that the original document is tilted, ceasing transport of the original document;
a timing-determining step of, when it is determined in the determining step that the original document is not tilted and that the original document will pass a position at which the original document is to be detected by the first detecting unit, determining a timing for reading the original document by using the reading unit, relative to a time point at which the original document is detected by the first detecting unit, and, when it is determined that the original document is not tilted and that the original document will not pass a position at which the original document is to be detected by the first detecting unit, determining a timing for reading the original document by using the reading unit, relative to a time point at which the original document is detected by the second detecting units; and a reading step of causing the reading unit to read the original document at the determined reading timing.

\* \* \* \* \*